United States Patent [19]

Burkhardt

[11] Patent Number: 4,819,787
[45] Date of Patent: Apr. 11, 1989

[54] APPARATUS FOR TRANSPORTING MATERIALS

[76] Inventor: Volker Burkhardt, Lerchenstrasse 29, 7085 Bopfigen, Fed. Rep. of Germany

[21] Appl. No.: 749,118

[22] Filed: Jun. 26, 1985

Related U.S. Application Data

[63] Continuation of Ser. No. 446,268, Dec. 2, 1982, abandoned.

[30] Foreign Application Priority Data

Dec. 5, 1981 [DE] Fed. Rep. of Germany ....... 3148176

[51] Int. Cl.⁴ .............................................. B65G 13/06
[52] U.S. Cl. ................................................... 198/781
[58] Field of Search ....................... 198/781, 789, 791; 192/56 R, 150; 464/30, 39, 40, 42, 44, 47

[56] References Cited

U.S. PATENT DOCUMENTS

| | | | |
|---|---|---|---|
| 3,667,589 | 6/1972 | Constable | 198/789 |
| 4,103,769 | 8/1978 | Jorgensen | 198/789 X |
| 4,185,735 | 1/1980 | Hammond | 198/789 |
| 4,193,492 | 3/1980 | Hammond | 198/781 |
| 4,325,474 | 4/1982 | Rae | 198/781 |
| 4,366,899 | 1/1983 | Doro | 198/781 |
| 4,421,224 | 12/1983 | Dingman | 198/781 |
| 4,448,302 | 5/1984 | Weaver et al. | 198/781 |
| 4,508,212 | 4/1985 | Bulle et al. | 198/781 |

FOREIGN PATENT DOCUMENTS

| | | | |
|---|---|---|---|
| 300359 | 7/1916 | Fed. Rep. of Germany | 198/791 |
| 2041509 | 3/1973 | Fed. Rep. of Germany | 198/781 |
| 7716809 | 9/1977 | Fed. Rep. of Germany | 198/781 |
| 2840044 | 3/1978 | Fed. Rep. of Germany | 198/781 |
| 2380963 | 9/1978 | France | 198/781 |

Primary Examiner—Joseph E. Valenza
Attorney, Agent, or Firm—Walter H. Schneider

[57] ABSTRACT

Apparatus for transporting of materials by means of conveyer rollers, with a plurality of roller shafts journalled one behind the other in a lateral support member, wherein several roller shafts are driven by a common drive unit, is disclosed. Each roller shaft is furnished with a member capable of transferring torque and whereby the transport of the material is achieved by way of frictional contact. The conveyer rollers are operatively secured to the roller shafts and the torque transfer members are respectively coupled to the pertaining roller shaft by means of a device capable of transferring frictional force.

4 Claims, 4 Drawing Sheets

APPARATUS FOR TRANSPORTING MATERIALS

This is a continuation of application Ser. No. 446,268, filed Dec. 2, 1982, now abandoned.

BACKGROUND OF THE INVENTION

1. Field of the Invention

The present invention relates generally to improvements in or relating to apparatus for transporting materials. More particularly, the present invention relates to apparatus for transporting of materials on conveyer rollers, which rollers are arranged on roller shafts which are journalled, one behind the other, laterally in a support member, and wherein several roller shafts are driven by a common drive unit, with each roller shaft being furnished with a member capable of transferring torque, and whereby the transporting of the material is effected by way of friction contact.

In general, there are utilized support members at both ends of the roller shafts, however, this is not always required and the conveyer rollers, arranged on the roller shafts, extend between the support members.

2. Description of the Prior Art

Apparatus for transporting of materials are furnished either with a positive drive or, as is contemplated in this specification, with a drive including friction contact. Thus, the transport of the material is in conformity with the friction value which results from the sum of the individual values of the parts or components involved. Transporting of the material is only carried out when the path is clear. According to the present state of the art this is achieved thereby that the conveyer rollers are connectible to the roller shafts only by way of friction contact, i.e. as required, they can rotate with respect to the roller shafts. The roller shafts, in turn, are positively connectible to a drive unit, which usually includes chain or sprocket wheels which are laterally supported at the support member. Motive force is provided by short chains extending from sprocket to sprocket, whereby for each roller there are required two sprocket wheels to be arranged alongside one another, or the motive force can be imparted by means of a continuous chain. In like manner, the drive may include a belt or belts with tooth-like projections.

In the event that there occurs in such prior art apparatus an undesired accumulation, leading to deceleration of the velocity of the equipment, the conveyer rollers continue to rotate with respect to the roller shafts. There does then substantially occur no relative movement between the conveyer rollers and the material to be transported, whereby damage to the material is avoided.

It is of disadvantage then, however, that this so-called friction-drive is relatively inaccurate, such that, that the transport of material is not always carried out without disruptions. For example, further conveying may be disrupted when material is laterally lodged against some projection. Furthermore the friction conditions vary in response to changes in moisture, degree of cleanliness, temperature and the like. In addition, the friction-drive is dependent upon the weight of the material to be transported, such that, generally, the apparatus would only be suitable for transporting materials of uniform mass.

SUMMARY OF THE INVENTION

There has continued to remain, therefore, a need for improving the conveyer apparatus of the class briefly described above.

It is an object of the invention to provide an apparatus whereby the transport of materials is achieved in a more precise and assured manner.

It is further an object of the present invention to provide an apparatus for transporting materials in which the transport is enhanced by friction contact.

These various objects are met in accordance with this invention by arranging the conveyer rollers on shafts so that they rotate therewith and by members capable of transferring torque which are coupled to a pertaining roller shaft by way of a device capable of transferring friction force.

In contrast to the state of the art, the conveyer rollers are herein positively secured to the roller shafts, whereas now, in contrast thereto, the torque transfer members, which up till now were directly or indirectly fast-secured to the roller shafts, are coupled by way of friction contact to the roller shafts.

By way of this measure one can utilize more assuredly and in more simple manner the required transfer forces, or the friction force, respectively. Because the torque transfer members are laterally arranged on a support member, and accordingly are protected, or more readily protectable, there will not arise problems due to dirt and similar conditions. As well operation can be continued during wet conditions without an attendant change of the friction force. While heretofore during an accumulation only the conveyer rollers were "at rest", there is now effected a stoppage of all the roller shafts.

In apparatus according to the prior art there also arose the danger that the material to be transported, if it were not fully centered with its center of gravity, would become wedged due to turning on the conveyer rollers. For this reason one had to assure in the apparatus of the prior art, that the material would move at all times in a straight line. Since in accordance with one aspect of the present invention the conveyer rollers are positively secured to the roller shafts, the material to be transported is, accordingly forced to move in a straight line, and, particularly, independent of the position of the center of gravity. This will apply, of course, only as long as no accumulation occurs.

In accordance with one embodiment of the present invention, the device for transferring friction force comprises a drive unit with a driven longitudinal shaft which extends alongside a support member, with drive rollers being arranged, so as to be freely rotatable, on the longitudinal shaft. The drive rollers cooperate with shaft rollers arranged at right angle to the drive rollers, which shaft rollers are respectively positively or fast secured, so as to be rotated therewith, to the roller shafts. The embodiment further comprises an adjustment ring for each drive roller, with the adjustment ring being located at a distance away from a pertaining drive or friction roller and the adjustment ring being fast secured, in radial direction, to the longitudinal shaft. For torque transfer there is provided a spring between the adjustment ring and the pertaining drive roller, particularly on the front-faces directed towards one another.

Hitherto the drive arrangements on the longitudinal shaft, which would drive all or a corresponding number of roller shafts, together by means of the drive units arranged thereon, were positively or fast secured to the longitudinal shaft. In accordance with one aspect of the present invention, the drive or friction rollers, wheels or similar members, are located on the longitudinal shaft so as to be freely rotatable, i.e. they are arranged with friction contact on the longitudinal shaft, and for further torque transfer there are provided springs which are respectively arranged between an adjustment ring and a pertaining drive roller. By a corresponding selection of a spring, the value of the torque may be selected. Thus, when the predetermined value for the force of resistance is exceeded, caused, for example, by an accumulation of the material to be transported, the drive rollers are "at rest".

When provision is made that the adjustment rings are moveably arranged, to be moved in axial direction, on the longitudinal shaft, then the torque to be transmitted can be adjusted in a simple manner by a corresponding decrease or increase of the distance of the adjustment ring away from its pertaining drive roller, i.e. by adjustment of the force of the spring, whereby changes of torque can be effected in similar manner as required.

Since there occurs during an accumulation of material on the conveyer a relative movement between the spring and the pertaining front face of the drive roller, one can provide a check ring, which is forced under pressure and with friction contact against the front face of a pertaining drive roller, with the pertaining spring, or spring end, being supported by the check ring on the side of the drive roller.

For positive and assured guiding of the spring there may be provided that the spring is located with each end in an annular guide groove provided in the pertaining faces of the check ring and the adjustment ring. As well, for positive support of the spring, it may, additionally as well as separately, be supported by a stop-guide ring, with the end of the spring to be supported being capable of moving over the stop-guide ring for at least a short distance.

The drive rollers and the cooperating shaft rollers can be of the type including conical gear wheels.

It is, however, of advantage that the drive rollers and the shaft rollers are friction rollers. Such friction rollers are more readily adjusted to prevailing conditions and there would arise no problems related to meshing of gear teeth.

It may be provided hereby that the two friction rollers come into contact with one another at a conical surface.

In this manner, the torque to be transferred is a function, respectively, of the friction surface between the drive roller and the shaft roller, the friction surface between the check ring and the front face of the pertaining drive roller, and the frictional contact corresponding to the wedge-angle between the two friction rollers. The friction force to be transferred between the check ring and a pertaining drive roller is herein determined by the force or tension of the spring. The resulting friction contacts, for one, can be exactly controlled, whereby a correspondingly exact driving of the roller shafts will be feasible.

It is of advantage when one of the two friction rollers is furnished with an O-ring at its contact surface, with the frictional contact being effected via said O-ring.

The O-ring provides the advantage that it can be replaced upon wearing down, which replacement can be readily carried out and without the necessity of disassembling the entire conveyer arrangement. It will merely be required to open the bearing blocks of the pertaining roller shaft at such locations requiring replacement of an O-ring.

For ease of mounting the O-ring there may be provided, on the friction roller on which the O-ring is to be mounted, an annular groove for seating the O-ring, with the roller being substantially conically tapered away from the groove to the pertaining front face.

This arrangement will facilitate the mounting of the O-ring, which will be pulled across the corresponding taper at the pertaining front face.

Due to a consideration of wear it is further of advantage that the drive roller is rotatable journalled on a sleeve, which sleeve, in turn, is secured fast to the longitudinal shaft.

When there occurs an accumulation, i.e. when the pertaining roller shafts are "at rest", there occurs a relative movement between the pertaining drive rollers and the longitudinal shaft, with the corresponding contact being substantially unilateral. Because of this, there arises at times the danger that the drive rollers become worn and the mounting bore would be out of round, oval or otherwise deformed. Where there is provided, in accordance with one aspect of the present invention, a sleeve, which is fast secured to the longitudinal shaft, the relative movement occurs between the drive roller and the sleeve. The sleeve, however, could be produced of a softer material, e.g. a suitable plastic or synthetic material, whereby wearing of the drive roller would be substantially reduced. Any wear would occur only at the softer sleeve, which, however, is rotating whereby such wear would be evenly distributed about the circumference.

In accordance with another aspect of the invention, instead of being arranged on the driven longitudinal shaft, the torque transfer members can also be arranged on the pertaining roller shafts, whereby they would be mounted so as to be freely rotatable. Each member for the transfer of torque is thereby clamped, and arranged with friction contact, between two retainer rings, which retainer rings are laterally arranged on each side of a member and rotation-fast on the pertaining roller shaft. On one side of such torque transfer member there is arranged at a predetermined distance an adjustment ring which is rotation-fast secured to the roller shaft. The torque transfer is further achieved by way of a spring which is respectively mounted with its ends between an adjustment ring and the retainer ring arranged on that side of the member which is closest to the adjustment ring.

The transfer of torque for driving a roller shaft is now achieved by way of friction contact between the respective front faces of the retainer rings and the member for transferring torque, whereby the contact pressure of the spring will be the primary factor.

It may be of advantage that the adjustment ring is operatively connectible to the roller shaft so as to be moveable in axial direction, whereby in a simple manner the torque to be transferred can be controlled and/or varied as required.

In order to adapt to relative movements, the retainer ring which cooperates with an adjustment ring can also be arranged to be moveable in axial direction over a short distance.

The members for the transfer of torque can include worm wheels or similar gear wheels, which will cooperate with correspondingly shaped worm shafts or shafts having other correspondingly shaped teeth or projections. These may include, for example, trapezoidal configurations. Furthermore, in accordance with the scope of this invention, the members capable of transferring torque include sprocket and similar toothed wheels, which can be driven by chains, belts or the like in a manner known per se.

Further embodiments of the invention and other inventive features are contained in the claims.

DESCRIPTION OF THE DRAWINGS

In the drawings, which illustrate that which is presently regarded as the best mode of carrying out the invention.

DESCRIPTION OF THE PREFERRED EMBODIMENTS

Figure 1:
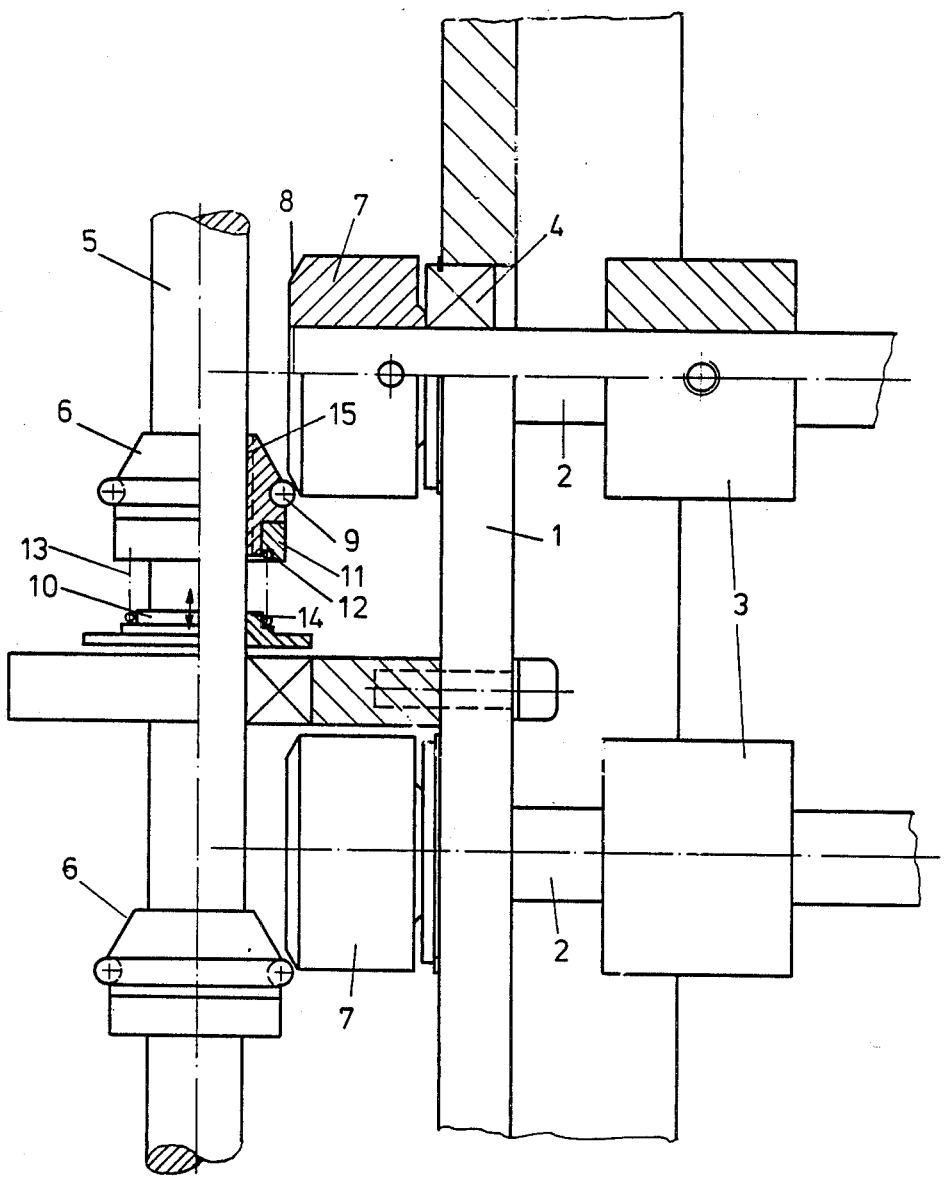
FIG. 1 is top plan view, partly in cross section, of one side of an apparatus in accordance with the invention with one embodiment of devices for the transfer of frictional force.

Referring now to the figures of the drawings, the apparatus for transporting materials has two lateral support members 1, with only one of these being shown in the drawings, between which there are arranged roller shafts 2 with respectively several conveyer rollers 3. The conveyer rollers 3 are arranged adjacent to one another and only one roller 3 is shown for each roller shaft 2. The roller shafts 2, in turn, are journalled in the support members 1 by way of journals 4.

The drive means or units for the roller shafts 2 are arranged on one side of a support member 1, whereas the other support member merely serves to journal the other ends of the roller shafts 2.

Figure 2:
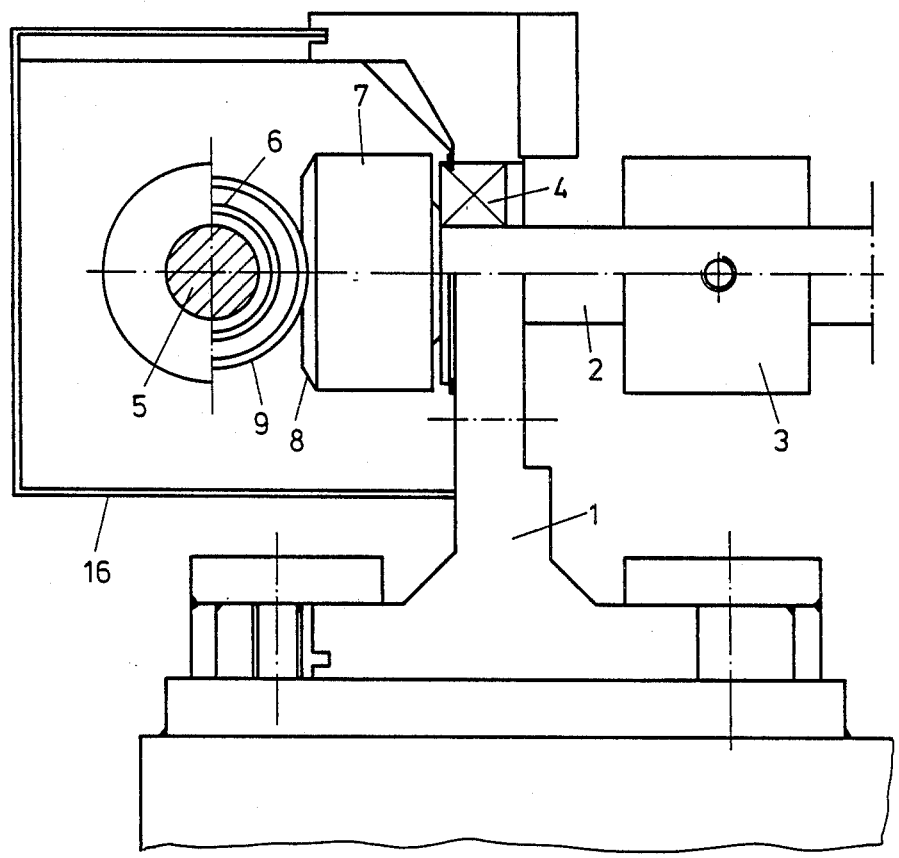
FIG. 2 is a side elevational view, partly in cross section of the apparatus shown in FIG. 1.

In accordance with the embodiments shown in FIG. 1 and FIG. 2, the devices for the transfer of frictional force for the roller shafts 2, include a longitudinal shaft 5, with conical friction rollers 6 being arranged thereon. The friction rollers 6 are secured so as to be freely rotatable. The conical friction rollers 6 cooperate with friction rollers 7 as shaft rollers. The shaft rollers 7 are fast secured on the roller shafts 2, so as to rotate therewith, and each roller 7 is provided, on that side which is directed towards a pertaining drive roller 6, with a wedge-shaped chamfer or similar bevel, generally designated by the reference numeral 8. Each of the conical friction rollers 6 is provided with an O-ring 9, whereby frictional contact can be established with the shaft roller 7, particularly at the bevel 8. At a distance to each conical friction roller, or drive roller, 6 there is provided, for each drive roller 6, an adjustment ring 10 which is fast secured to the longitudinal shaft 5. On the side directed towards the adjustment ring, each conical friction roller 6 is furnished with a check ring 11 which can be moved over a shoulder of the roller 6. Each check ring 11 is furnished with an annular groove 12 into which there can be inserted the one end of a spiral or helical spring 13. The other end of the spring 13 is supported by a stop-guide ring 14 at the adjustment ring 10. In this manner, the spring 13 is positively guided between these two components and it presses the check ring 11 against the pertaining side of the conical friction roller 6, and, thereby, also the roller 6 against the bevel 8 of the pertaining friction roller 7. The O-ring 9 which establishes the frictional contact is located in an annular groove, extending from which the roller 6 is shaped, towards the corresponding end, substantially conically, or tapered.

For adjustment or varying the force of the spring 13, the adjustment ring 10 can be moved, in axial direction, on the longitudinal shaft, see the double-headed arrow in FIG. 1. The adjustment ring 10 can readily be secured by way of of a screw, not shown, which would be loosened for movement of the adjustment ring 10. Of course, other means for fixing the ring 10 can be employed, which would allow an axial movement of such ring.

As required, each conical friction roller 6 can be provided with a sleeve 15, shown in dash lines in FIG. 1, which is fast secured to the longitudinal shaft, so as to be rotated therewith. In such an embodiment, the friction contact, as well as the relative movement, occur between the sleeve 15 and the inner central bore wall of the roller 6.

By means of a cover 16, of sheet metal or the like, the entire drive arrangement can be protected against the influence of moisture, dirt and the like. At the same time, the risk of danger to operators and other persons is reduced or substantially avoided.

Operation of the embodiments shown in FIG. 1 and FIG. 2 is as follows: The torque of longitudinal shaft 5 is substantially transferred by way of the spring 13, by intervention of friction contact, to the pertaining conical friction roller 6, and thence, also by friction contact, to the pertaining friction roller 7. the friction roller 7 is secured to the roller shaft 2 in the same manner as are secured the conveyer rollers 3. Thus, when the roller shafts 2 are rotated by the rollers 7, the conveyer rollers 3 will be rotated as well. Frictional contacts are, accordingly, established between the check ring 11 and the pertaining front face of the conical friction roller 6 at the O-ring 9 and either between the longitudinal shaft 5 and the roller 6 or the sleeve 15 and the conical friction roller 6. Should there occur an accumulation of material to be transported, the roller shafts 2 will cease to rotate and there will be no further relative movement between the conveyer rollers 3 and the material to be transported on the conveyer. This applies when the force of resistance is greater than the introduced torque. When this applies, roller shaft 2 and rollers 3, 6 and 7 cease to rotate, or come to be "at rest", and there occurs a relative movement between the longitudinal shaft 5 and the conical friction roller 6, or the sleeve 15 and the roller 6, respectively, as well as between the check ring 11 and the roller 6. By way of a corresponding adjustment of the adjustment ring 10 and/or a corresponding selection of spring 13, one can select the desired torque, at which the roller shafts are to cease to rotate, in a simple manner.

Figure 3:
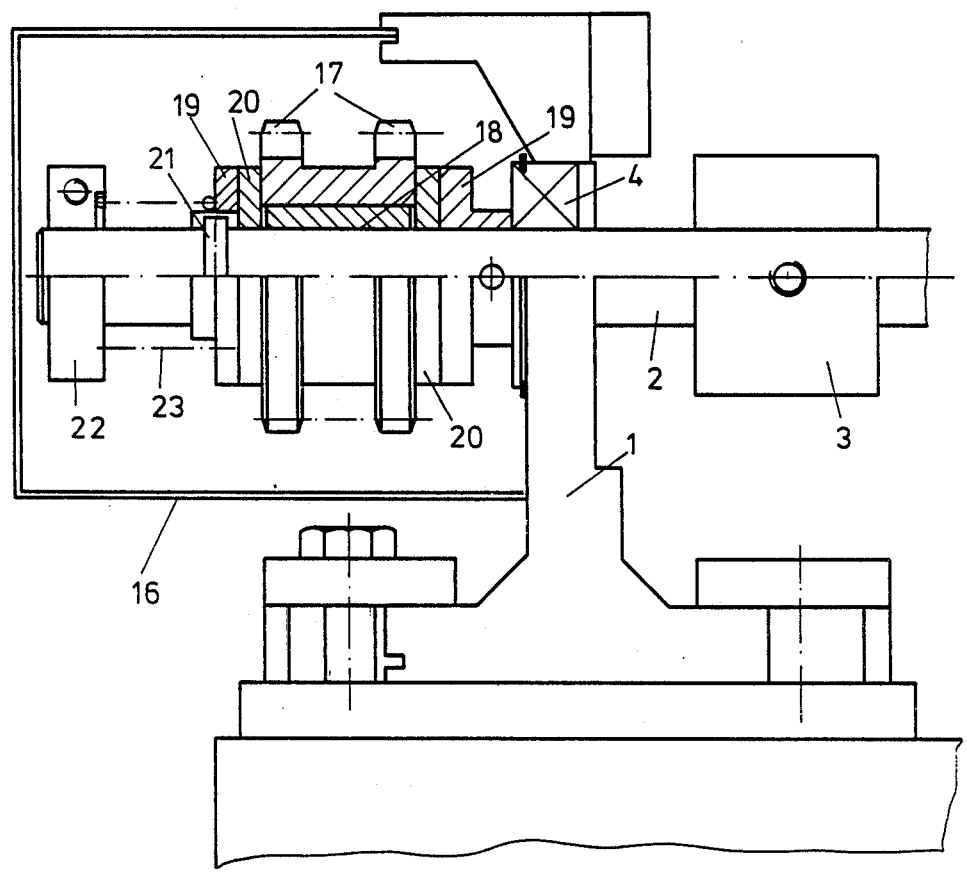
FIG. 3 is a side elevational view, partly in cross section, of an apparatus equipped with sprocket wheels as members for transferring torque.

FIG. 3 shows a further embodiment of the invention, whereby like parts are designated by like reference numerals. In this embodiment, the devices for transfer of frictional force each comprise two chain or sprocket wheels 17 which are arranged adjacent to one another, and which may be produced in a single, unitary structure. The sprocket wheels 17 are arranged so as to be freely rotatable, with a sleeve or sliding bearing 18 being provided between the sprocket wheels 17 and the shaft 2 on which the sprocket wheels are arranged. Instead of a sleeve bearing 18, of course, there could be utilized needle bearings, roller bearings, or similar bearings. On both end faces of the sprocket wheels 17 there are, respectively, provided a retainer ring 19 and for each retainer ring, a friction disc 20. Of course it is fully within the scope of the present invention that the one friction surface can be unitary with the retainer ring 19. Both retainer rings 19 are arranged on the roller shaft 2 so as to be rotation-fast, with the retainer ring arranged to the outer, free, end further being adapted to be moved in axial direction. This is attained by way of an adjusting spring or similar member, generally designated by the numeral 21, which is arranged in an axial groove.

At a distance away from the outer retainer ring 19 there is also arranged a second adjustment ring 22. Adjustment ring 22 is also arranged on roller shaft 2 so as to be rotation-fast. However, by way of a corresponding securement, the ring 22 can be shifted in axial direction. Between the adjustment ring 22 and the retainer ring 19 there is operatively connected a spring 23. The spring 23 may, as in the case in the embodiment in accordance with FIG. 1, be guided in an annular groove in the adjustment ring 22 and a corresponding stop-guide ring, corresponding to stop-guide ring 14 of the embodiment shown in FIG. 1, on the retainer ring 19.

The friction contact and thereby the driving of the roller shaft 2 are achieved, in this embodiment of the invention, by way of the two end faces, or front sides, of the sprocket wheels 17 and the friction surface between the bearing 18 and the roller shaft 2. The corresponding contact pressure of the retainer rings 19 against the side faces of the sprocket wheels 17 is produced by spring 23. When rotation of the roller shaft 2 ceases, there occurs a relative movement between the retainer rings 19 and the two side faces of the sprocket wheels 17. The coupling, and thereby the entire input of motive or driving force is by way of the two sprocket wheels 17 and attendant chains which join pertaining sprockets in the drive arrangement. Where the motive power is transmitted by way of a single chain, there will only be required one sprocket wheel 17 on a roller shaft 2. Functioning and results of the embodiment will be the same, however.

As well, instead of sprocket wheels, one may utilize other wheels, for example belt or toothed belt pulleys or the like transmission elements, affording the transmission of motive power to the roller shafts 2.

Figure 4:
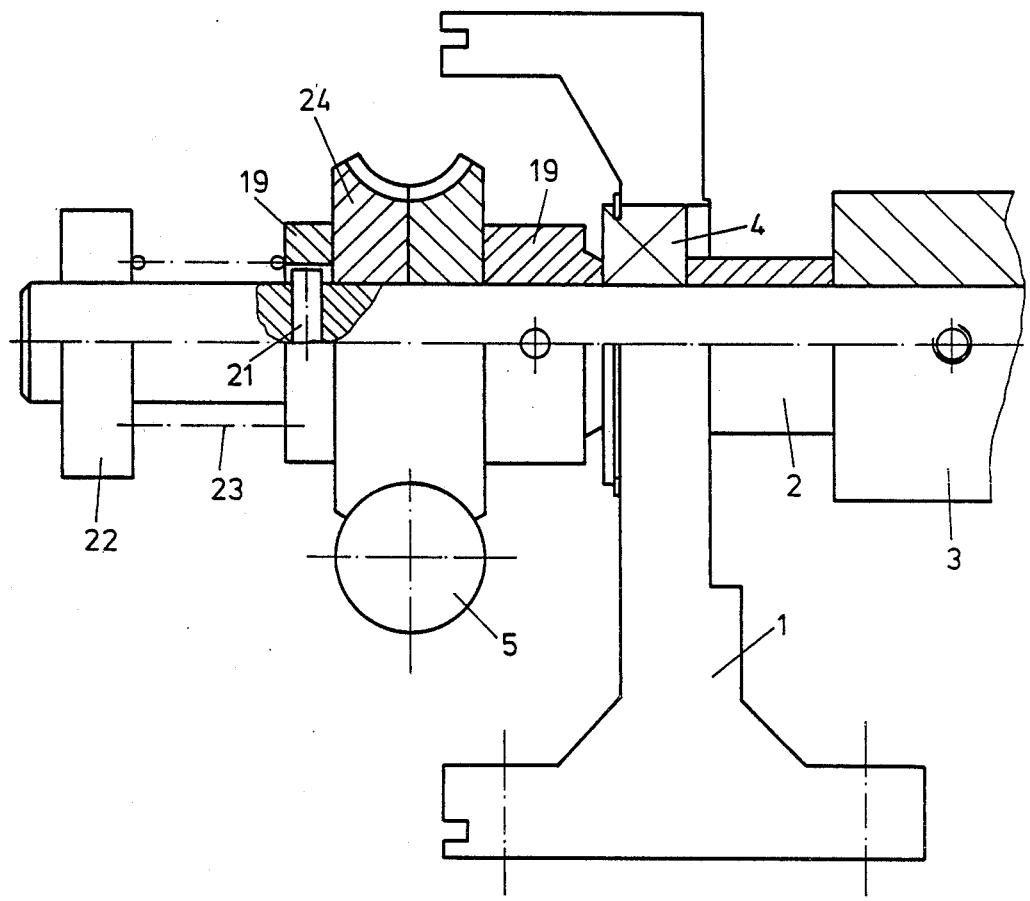
FIG. 4 is a side elevational view, partly in cross section, with a worm wheel as member for transferring torque.

The embodiment shown in FIG. 4 corresponds generally to that shown in FIG. 3, including its operation, so that like parts are designated with like reference numerals.

The sole difference with respect to the embodiment according to FIG. 3 arises, in the embodiment according to FIG. 4, through the arrangement of a single worm wheel 24 on each roller 2, instead of the two sprocket wheels 17. Each worm wheel 24 is clamped between two retainer rings 19. Since the two retainer rings 19 are producing, due to the force of spring 23, an axial or thrust force which is directed respectively to the other retainer ring, one can utilize for this purpose worm wheels which are of simple construction. Thus, the worm wheels 24 can be manufactured in a simple manner of two parts, since the two parts will be pressed together. For the drive arrangement in accordance with this embodiment it will only be required that the longitudinal shaft 5 is a worm shaft, or furnished at the respective intervals at which it is to cooperate with the worm wheel 24, with worm teeth.

As is the case in the embodiment according to FIG. 3, the driving of the roller shaft 2 is by way of friction contact between the two retainer rings 19 and the side faces of the worm wheel 24, and, in part, by way of the sleeve bearing 18. When the roller shaft 2 is "at rest", there may occur a relative movement between the two retainer rings 19 and the worm wheel 24.

Of course, the longitudinal shaft 5 can be in the form of a threaded spindle having trapezoidal teeth, which is adapted to cooperate with a correspondingly shaped gear wheel which is arranged on the roller shaft 2.

Reference in this disclosure to details of the specific embodiments described is not intended to restrict the scope of the appended claims, which themselves recite those features regarded as essential to the invention.

I claim:

1. An apparatus for transporting material which comprises a frame having two longitudinally extending support members each having journalled therein for rotation the opposite ends of a plurality of roller shafts disposed along the length of said support members, each roller shaft having a shaft roller securely fixed at one end and at least one conveyor roller securely fixed between its ends whereby said roller shaft and said conveyor roller rotate only when said shaft roller is rotated; and means for rotating said shaft roller comprising a drive shaft extending longitudinally along side one of said support members having mounted thereon in frictional rotational engagement therewith a drive roller which is also in frictional rotational engagement towards one of its ends with said shaft roller; an annular groove towards the other end of said drive roller in which is positioned a check ring having a smooth continuous contact surface in frictional rotational engagement with a complementary surface of said annular groove of said drive roller; an adjustment ring securely fixed to said drive shaft for rotation therewith, said adjustment ring being fixed to said drive shaft at a preselected distance from said check ring; a spring surrounding said drive shaft one end of which contacts said adjustment ring for rotation therewith and the other end of which contacts said check ring for rotating it; and adjusting means for securing said adjustment ring to said drive shaft whereby its distance from said check ring and the tension on said spring can be preselected, the rotary motion of said drive shaft being transmitted to said shaft roller by means of the frictional engagement of said check ring and said drive shaft with said drive roller, and said drive roller with said shaft roller.

2. An apparatus according to claim 1 in which said check ring is provided with an annular groove in which said one end of said spring is inserted, the other end of said spring being supported in a stop-guide ring at said adjustment ring.

3. An apparatus according to claim 2 in which said drive roller is cone-shaped towards its one end, said drive roller further being provided with an O-ring at the base of its cone by which frictional engagement with said shaft roller is made through a bevelled edge on said shaft roller.

4. An apparatus according to claim 3 in which the mounting of said drive roller on said drive shaft is by means of a sleeve securely fixed to said drive shaft.

* * * * *